United States Patent [19]
Knotek

[11] Patent Number: 6,009,735
[45] Date of Patent: Jan. 4, 2000

[54] PORTABLE TUBE CUTTING AND FINISHING DEVICE

[76] Inventor: Stanley F. Knotek, 13 Holly Dr., E. Hampton, Conn. 06424

[21] Appl. No.: 09/336,221

[22] Filed: Jun. 19, 1999

[51] Int. Cl.[7] .................................................... B21B 27/06
[52] U.S. Cl. .................................................................. 72/70
[58] Field of Search .................................. 72/70, 71, 72, 72/49, 50, 51, 52

[56] References Cited

U.S. PATENT DOCUMENTS

| 4,571,971 | 2/1986 | Wood ........................................... 72/70 |
| 4,953,377 | 9/1990 | Thorell ......................................... 72/70 |

Primary Examiner—Rodney Butler
Attorney, Agent, or Firm—McCormick, Paulding & Huber LLP

[57] ABSTRACT

A portable tube cutting and finishing device employs a manual electrically operated power drill supported on a frame and driving a pair of tube drive and support rollers in a cradle arrangement. A tube supported by the rollers is rotated thereby through the operation of a pair of gears respectively associated with the rollers, and a gear train with an initial gear being rotated by on output member and a small universal connector driven by the power drill. The power drill is detachably assembled with the frame and may be used for other purposes. A tool carrier driven by one of the gears in the gear train, is of hollow cylindrical configuration with opposite ends respectively open and closed. Mounted within the closed end of the carrier is a conventional reamer and adjacent thereto a hollow cylindrical burnishing tool serves to lightly machine an external end portion of a freshly cut tube. Thus, reaming, resulting in internal deburring and external burnishing can be accomplished simultaneously and substantially instantaneously on the tube end portion.

9 Claims, 2 Drawing Sheets

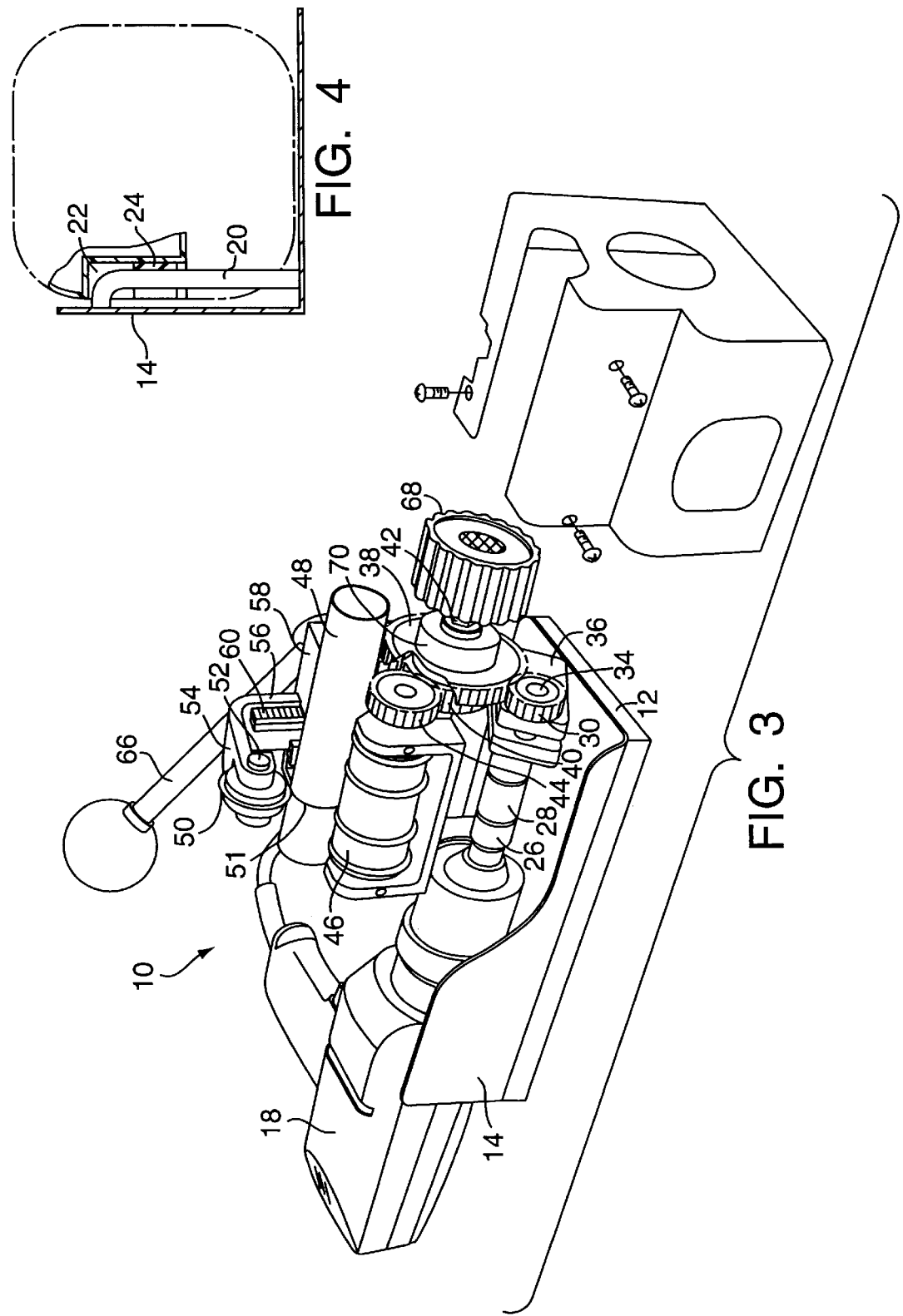

PORTABLE TUBE CUTTING AND FINISHING DEVICE

FIELD OF INVENTION

The present invention relates to tube cutting and finishing apparatus and, more particularly, to an improved portable tube cutting and finishing device.

BACKGROUND OF THE INVENTION

Apparatus for cutting copper, plastic and other tubing has heretofore been available and a common configuration of such apparatus involves the provision of a pair of parallel tube supporting rollers in a "cradle arrangement" supporting the tube with its axis parallel to the rollers above and partially between the same. A rotary tube cutting element also having its axis parallel with that of the tube support rollers is urged into engagement with a tube to sever the same and moved away from the tube for the introduction and removal of tube sections. Power driven rollers and/or power driven rotary cutting elements are also conventionally employed in prior art apparatus.

Portable tube cutting apparatus has also been provided for use in situ but to date has not proven wholly satisfactory.

It is the general object of the present invention to provide an improved portable tube cutting and finishing device particularly suited to copper tubing and which may be manufactured at economic advantage and which is yet highly efficient in rapidly severing copper tubing and finishing an end portion thereof for soldering.

SUMMARY OF THE INVENTION

In accordance with the present invention and in fulfillment of the foregoing object, a portable tube cutting and finishing device comprises a frame adapted to support and detachably hold a manual electrically operated power drill and a pair of tube drive and support rollers in a "cradle arrangement". The rollers support a tube to be severed with the tube above and partially between the same and with the rollers and tube axes parallel and substantially horizontal. A motion transmitting mechanism including a gear train is connected between the rotary output shaft of the power drill and the tube drive and support rollers and a rotary tube cutter element is supported about a substantially horizontal axis above the tube for vertical movement in a substantially radial plane toward and away from the tube in a tube cutting and retraction operation. A manually operable handle connected with the cutter element support serves to move the same radially toward and away from the tube for efficient and rapid cutting of the tube.

A combined tube reaming and burnishing or finishing assembly is also connected with and driven by one of the gears in the gear train and includes separate but simultaneously operable reaming and burnishing tools. The reaming tool is rotatably driven by said one gear and serves to internally machine an end portion of a freshly cut tube whereby to deburr the same. The burnishing tool is also rotatably driven by said one gear and serves to lightly machine an external end portion of the freshly cut tube simultaneously with the reaming operation. Thus, the tube end portion is completely prepared and in readiness for soldering in a tube joining operation or the like.

Adaptation of the device for the accommodation of a portable power drill contributes to the ease and economy in manufacture of the device. Obviously, substantial cost may be achieved in the elimination of a dedicated motor for the device. Moreover, the device absent a mounted power drill or permanently mounted and dedicated motor, is of desirably light weight and portability is enhanced. A majority of operators will of course own a suitable portable power drill which can be employed when the device is used in situ.

The provision for the simultaneous reaming and burnishing of an end portion of a freshly cut copper tube also contributes substantially to the rapid and efficient operation of the device. It is merely necessary to remove a freshly cut tube end from its cutting position atop the support rollers and in one short and easy step, insert the tube end into a tool carrier which accomplishes both reaming and burnishing in a simultaneous and almost instantaneous operation.

BRIEF DESCRIPTION OF THE DRAWINGS

FIG. 3 is another exploded perspective view showing a tube mounted on tube support rollers with a rotary cutting element in substantial engagement therewith; and FIG. 4 is a fragmentary section taken generally as indicted at 4, 4 in FIG. 1 and showing a detachable connecting device for securing a portable electrically operated power drill in assembly with a frame of the device.

PREFERRED EMBODIMENT OF THE INVENTION

Figure 1:
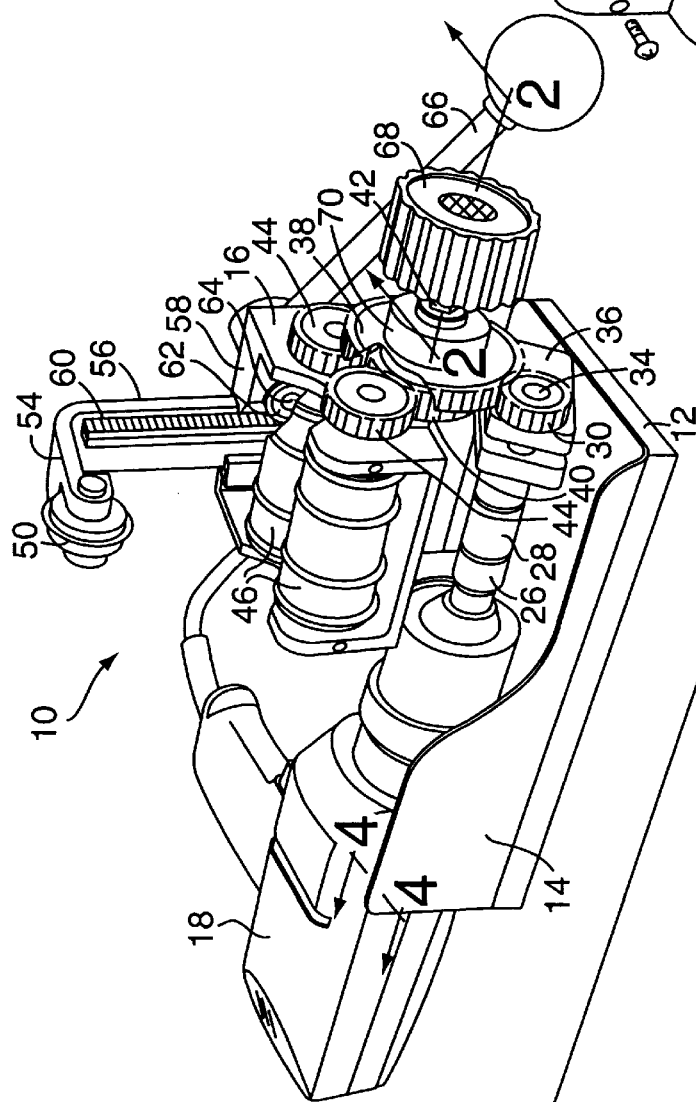
FIG. 1 is an exploded perspective view of the portable tube cutting and finishing device of the present invention with a cover removed for better illustration of the operation of the device.

Referring particularly to FIG. 1 it will be observed that a portable tube cutting and finishing device in accordance with the present invention is indicated generally at 10. The device comprises a frame having a base portion 12, a front side plate 14, and an upstanding rear portion 16. Detachably connected to the frame and supported on the base 12 thereof is an electrically operated portable power drill 18 which may be any of a number of different well known types or brand names, but which in the present embodiment of the invention comprises a Sears Craftsmen ⅓ Horsepower Variable Speed Reversible Drill. The power drill is supported on its side with a top portion of its housing adjacent the upstanding front frame member 14 in FIG. 1.

As best illustrated in FIG. 4, a small round L-shaped bar 20 is attached at an upper end to the front frame member 14 and at a lower end to the base portion 12 of the frame. The housing of the drill 18 has a slot 22 in a top portion thereof and a small holding clip 24 is disposed in the slot for the retention of a conventional chuck operating tool associated with the drill. The bar 20 is entered in the clip 24 which may be of plastic or the like and which is provided with a relatively narrow mouth portion and a wider body portion for retention of the handle of the tool and which also serves to detachably connect the drill to the frame of the device 10. It is necessary merely to urge the top portion of the power drill toward the upstanding frame portion 14 to cause the bar 20 to snap into the clip 24 as shown in FIG. 4 and, conversely, the housing of the drill may be drawn away from the frame portion 14 to disengage the bar from the retention clip.

At a front end portion of the drill 18 a small female drive element 26 may be held in its chuck for connection with a universal connector 28. With the frame element driven by the drill and connected with a complementary male element associated with the connector 28, the latter can serve to drive a small gear 30 on a shaft 34 journaled in an adjacent frame portion 36. The gear 30 is an initial element in a drive train and meshes with a larger gear 38 which is mounted on a shaft 42 in common with a gear 40, disposed rearwardly thereof in FIG. 1. A pair of gears 44, 44 mesh with and are driven by the gear 40 and are associated respectively with the tube support and drive rollers 46, 46. As will be apparent in FIG. 1, the rollers 46, 46 have substantially parallel and horizontal axes as do all of the aforementioned gears and the output member 26 of the power drill 18. Moreover, a "U" shaped arrangement of these elements provides for a desirably compact assembly with the support rollers mounted above the female output element 26 and the universal connector 28.

Referring now to FIG. 3, it will observed that a copper tube 48 to be severed is mounted on the support rollers 46, 46 with a small rotary cutting element 50 disposed thereabove and in cutting engagement therewith, a cutting line being shown at 51. The cutting element 54 is supported on a small shaft 52 about a horizontal axis and is journaled in and carried by an arm portion 54 which extends substantially horizontally and is connected with a second arm portion extending vertically downwardly at 56. The vertical arm portion 56 is mounted for vertical sliding movement in an upstanding rear frame portion 58 and carriers a vertically extending rack gear 60. The rack gear 60 is engaged with and driven by a small pinion 62 mounted on a shaft 64 which at an opposite end portion is connected with a manually operable handle 66, FIG. 1. As will be apparent, the handle 66 may be swung through an arc in a counterclockwise direction from the FIG. 1 to the FIG. 3 position thereof in urging the cutting wheel 50 downwardly and into engagement with a tube such as the tube 48 on the support rollers 46, 46. Conversely, a return or swinging clockwise movement of the arm 66 will retract and elevate the cutting wheel 50 for the sequential introduction and removal of tubes in tube severing operations.

It will also be apparent that the provision of the rack and pinion gears 60, 62 provides for automatic height adjustment in the cutting position of the wheel 50. That is, with a small tube the arm 66 may require a slightly longer arcuate travel and with a larger tube a somewhat shorter arcuate movement will result in engagement of the cutter with the tube and in a desired tube cutting operation.

Figure 2:
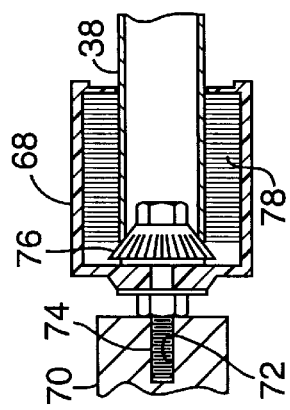
FIG. 2 is a fragmentary vertical section taken generally as indicated at 2, 2 in FIG. 1 and illustrating simultaneously operable reaming and burnishing tools within a tool carrier of the present invention.

Referring now to FIGS. 1 and 2, it will be observed that a tool assembly or tool carrier 68 is provided at a right hand end portion of the device and is detachably connected with a mounting device 70 best illustrated in FIG. 2. The mounting device is supported on and rotatable by the aforementioned gear 38 and includes a central bore or threaded opening 72. The tool carrier 68 has a shaft 74 which is threaded for engagement with the threaded opening 72 and which together therewith provides for the detachable connection of carriers 68, 68 of various size and diameter.

A reamer or reaming tool 76 disposed within the carrier 68 at a closed end thereof and which is rotatable therewith may take a conventional form. The carrier is open at an opposite end for the entry and engagement of a freshly cut end portion of a copper tube such as 38 which may be readily introduced manually to the carrier through its open end.

Simultaneously with the engagement of the end portion of a freshly cut tube 38 with the reamer 76 the end portion of the tube is engaged externally by a burnishing tool 78 and the end portion is thus completely prepared for soldering or the like.

As will be apparent, a copper tube to be severed may be placed in position atop the support rollers 46, 46, the arm 66 quickly operated in a severing operation, and the right hand end portion of the freshly cut tube may thereafter be removed in a quick and desirably simple movement by simply withdrawing the same horizontally slightly lowering and inserting the same into the carrier 68 for reaming, resulting in internal deburring, and external burnishing of the tube. The reaming and burnishing operations occur simultaneously as will be obvious and substantially instantaneously. Thus, the complete preparation of a tube end portion for soldering and the like is accomplished in a highly efficient and rapid manner.

I claim:

1. A portable tube cutting and finishing device comprising a frame arranged to support and detachably hold a manual electrically operated power drill and a pair of tube drive and support rollers in a cradle-like arrangement with a tube to be cut arranged above and partially between said suppport rollers, axes of the two rollers and tube being parallel and substantially horizontal, a rotary motion transmitting mechanism including a train of intermeshing gears connected between a rotary output shaft of the power drill and said pair of tube drive and support rollers, a rotary tube cutting element on a substantially horizontal axis supported above a tube on the rollers for substantially vertical movement in a substantially radial plane toward and away from the tube respectively in tube cutting and retraction movements, a manually operable handle connected with said rotary cutting element support and serving to move said cutting element support radially in said two directions toward and away from the tube, and a combined tube reaming and burnishing tool assembly connected with and driven by one of said gears in said gear train of the motion transmission mechanism, said tool assembly included a reaming tool rotatably driven by said one gear and serving to internally machine an end portion of a freshly cut tube whereby to deburr said freshly cut tube, and a burnishing tool also rotatably driven by said one gear and serving to lightly machine an external end portion of the freshly cut tube simultaneously with said reaming operation whereby to prepare said freshly cut tube for soldering in a tube joining operation.

2. A portable tube cutting and finishing device as set forth in claim 1 wherein said combined reaming and burnishing tool assembly takes the form of a hollow cylindrical tool carrier closed at one end and supporting a reaming tool internally at its closed end which faces outwardly toward an open end of the carrier so as to enter and machine an open end of a tube introduced manually to the carrier and engaged axially with the tool, and a hollow cylindrical burnishing tool mounted within the carrier adjacent but axially forwardly from the reaming tool toward the open end thereof so as to simultaneously externally engage and lightly machine the tube end portion introduced to the carrier and engaged by the reaming tool.

3. A portable tube cutting and finishing device as set forth in claim 1 wherein said support for said rotary cutting element and manually operable handle accommodate radial movement of said element as required for tubes of various diameters.

4. A portable tube cutting and finishing device as set forth in claim 1 wherein the power drill is of the type having a small slot in its housing for receiving and frictionally holding a small tool which operates a drill bit chuck on the drill, and wherein the frame of the tube cutting and finishing device is provided with an attachment member dimensioned to fit into and to be detachably held in the slot.

5. A portable tube cutting and finishing device as set forth in claim 1 wherein the power drill is detachably held by the frame with its axis substantially horizontal and parallel to the axes of the tube support rollers and the axes of the gears in the gear train.

6. A portable tube cutting and finishing device as set forth in claim 1 wherein the power drill is provided with a female output element held by its chuck, and wherein a small universal joint connector is provided with a male element engagable with the female element so as to be driven thereby and connectable in driving relationship with an initial one of said gears.

7. A portable tube cutting and finishing device as set forth in claim 2 wherein said tool carrier is detachably connectible with said one gear, and wherein a plurality of tool carriers varying in size are provided for selective detachable connection with and rotation by said one gear.

8. A portable tube cutting and finishing device as set forth in claim 3 wherein said support for said cutter element comprises an arm portion which extends substantially horizontally above a tube supported on said rollers and a connected arm portion which extends downwardly and which is movable upwardly and downwardly, the downwardly extending portion of the arm carrying a vertical rack gear, and wherein a pinion gear is also provided in driving engagement with the rack gear and driven by the manually operable handle.

9. A portable tube cutting and finishing device as set forth in claim 6 wherein said gears in said gear train comprise said initial gear driven by said universal joint connector, a second gear engaged with and driven thereby and which is detachably connectable with said tool carrier, a third gear mounted on a common horizontal shaft with said second gear and rotatable therewith, and a pair of gears each driven by said third gear and respectively driving said pair of parallel tube support rollers.

* * * * *